W. J. BERG AND A. B. KIDDER.
RIM TOOL.
APPLICATION FILED MAR. 4, 1919.
1,341,104.
Patented May 25, 1920.
2 SHEETS—SHEET 1.
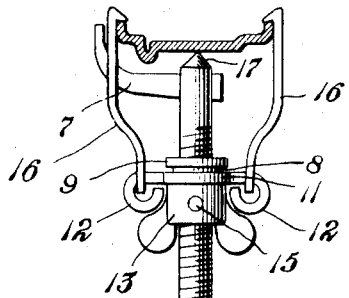
Fig. 1.
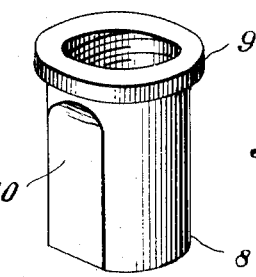
Fig. 4.
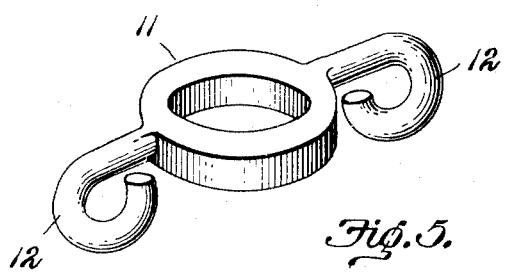
Fig. 5.
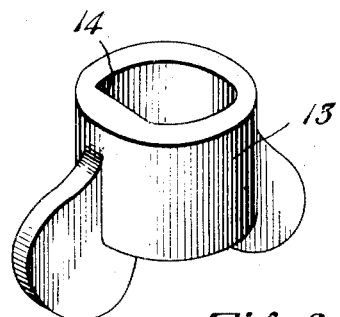
Fig. 6.
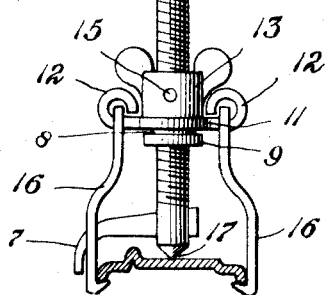
INVENTORS
William J. Berg and
Arthur B. Kidder.
ATTORNEYS.

W. J. BERG AND A. B. KIDDER.
RIM TOOL.
APPLICATION FILED MAR. 4, 1919.

1,341,104.

Patented May 25, 1920.
2 SHEETS—SHEET 2.

INVENTORS
William J. Berg 2nd
Arthur B. Kidder.

Frease, Merkel, Saywell and Bond.
ATTORNEYS.

UNITED STATES PATENT OFFICE.

WILLIAM J. BERG, OF MAXIMO, AND ARTHUR B. KIDDER, OF CANTON, OHIO; SAID KIDDER ASSIGNOR TO SAID BERG.

RIM-TOOL.

1,341,104.         Specification of Letters Patent.      Patented May 25, 1920.

Application filed March 4, 1919. Serial No. 280,590.

*To all whom it may concern:*

Be it known that we, WILLIAM J. BERG, a citizen of the United States, residing at Maximo, in the county of Stark and the State of Ohio, and ARTHUR B. KIDDER, a citizen of the United States, residing at Canton, in the county of Stark and State of Ohio, have invented a new and useful Rim-Tool, of which the following is a specification.

The invention relates to improvements in rim tools and has more especial reference to a tool for removing demountable, split rims from tires and replacing said rims upon the tires.

The object of the invention is to provide a tool adapted to contract the demountable rim for an automobile tire and hold the rim in such contracted position while the tire is removed therefrom and replaced thereon.

A further object is the provision of a tool which may be applied to the rim of a tire for expanding the same.

A still further object is the provision of a tool of this character which is easily and readily adjustable to rims of various sizes and which is simple and inexpensive in construction and durable and efficient in use.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

The invention thus set forth in general terms is illustrated in the accompanying drawings forming part hereof, in which—

Figure 2:
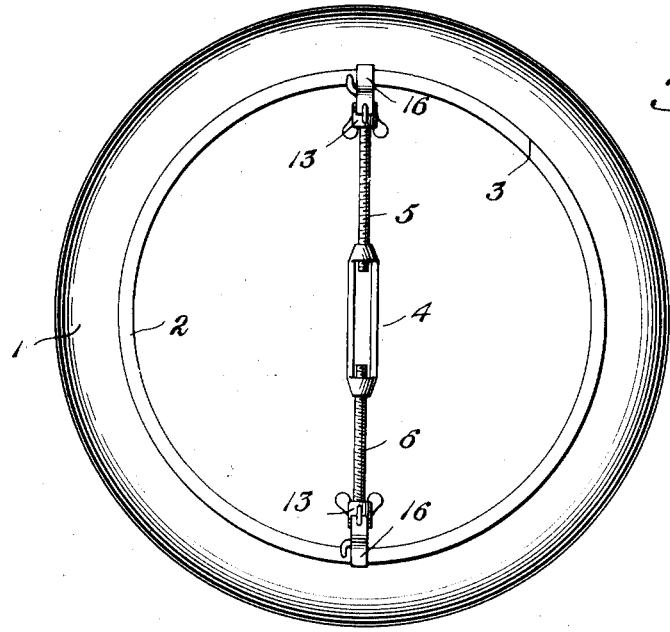
Figure 3:
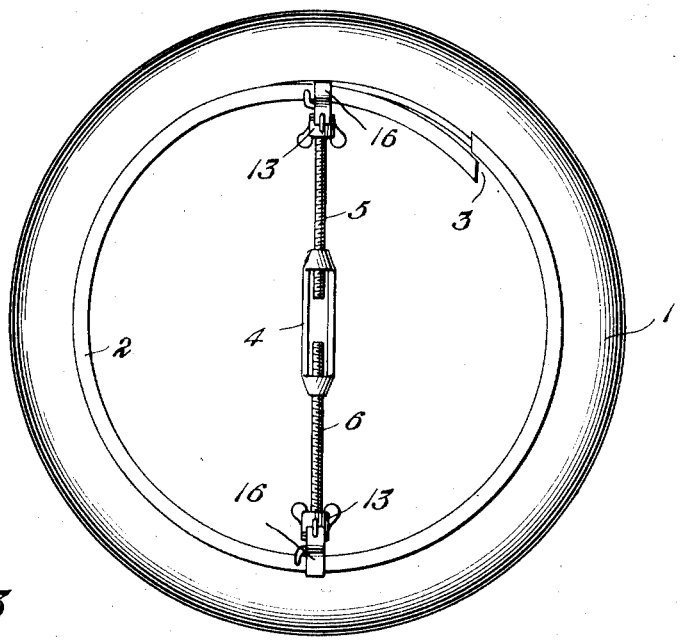

Figure 1 is a side elevation of a rim 2 embodying the invention;

Fig. 2, a view showing the tool applied to a rim;

Fig. 3, a view showing the rim contracted by the tool;

Fig. 4, a detail perspective of one of the adjusting nuts;

Fig. 5, a detail perspective of one of the rings which carries the rim engaging hooks; and Fig. 6, a detail perspective of one of the wing-sleeves which operate the adjusting nuts.

A practical embodiment of the invention is disclosed in the accompanying drawings, forming a part of this specification in which similar numerals of reference indicate corresponding parts throughout the several views.

A tire casing of usual and well known construction is indicated at 1, mounted upon an ordinary form of demountable rim 2, which is split at 3 in the usual manner in order to facilitate the removal of the tire therefrom or the replacing of a new tire thereon.

The rim tool comprises a turn-buckle 4 in one end of which screws a right handed turn buckle rod 5 while in the other end screws a left handed turn-buckle rod 6. A curved arm 7 is provided near the outer extremity of each of the rods.

Threaded upon each of the turn buckle rods is an adjusting nut 8, cylindrical in form and provided with the annular flange 9 at its outer end. Each of these adjusting nuts is provided with a flat portion 10 upon its outer surface, the purpose of which will be hereinafter explained.

Rotatably mounted upon each of the adjusting nuts adjacent the annular flange thereon is a ring 11 provided with diametrically disposed eyes 12. A wing sleeve 13 fits snugly upon each of the adjusting nuts and is provided upon its inner surface with a flattened face 14, which engages the flattened face 10 of the adjusting nut causing the nut to be rotated upon the turn-buckle rod with the rotation of the wing sleeve. This sleeve is considerably shorter than the adjusting nut thus allowing room for the ring 11 to rotate freely upon the adjusting nut between the flange 9 thereon and the outer extremity of the wing sleeve. If desired a pin 15 may be placed through the wing sleeve and adjusting nut after these parts are assembled in order to prevent the sleeve from being displaced.

A rim engaging hook 16 is loosely mounted upon each of the eyes 12, these hooks being arranged to grab the bead or flange of the demountable rim.

When it is desired to contract the rim in order to remove the tire casing therefrom the rim tool is adjusted to the size of the rim by turning the wing sleeves 13 moving the adjusting nuts upon the turn-buckle rods and bringing the rim engaging hooks 16 into the proper position to grip the rim. The hooks upon one of the turn-buckle rods are hooked over the rim at a point near the split therein and the hooks upon the other turn-buckle rod are hooked over the rim at a point diametrically opposite therefrom. The turn-buckle 4 is then given a few turns, moving the turn-buckle rods toward each other whereupon the portion of the rim near the split therein will be bent or deflected inwardly from the position illustrated in Fig. 2 to that illustrated in Fig. 3, contracting the ring sufficient to permit the removal thereof from the tire. In adjusting the adjusting nuts the pointed extremities 17 of the turn-buckle rods are brought into contact with the inner surface of the rim and the hooks are thus held in tight engagement with the rim preventing any accidental displacement thereof. The curved arms 7 act as guides to quickly center the tool upon the rim.

When it is desired to replace the rim upon the tire the turn-buckle is rotated in the opposite direction from that above described, moving the turn-buckle rods diametrically away from each other and expanding the rim forcing it back into a circular form as illustrated in Fig. 2 until the joint in the rim is securely made. The adjusting nuts may then be operated by means of the wing sleeve, disengaging the rim engaging hooks from the rim and the tool may then be easily removed.

We claim—

1. A tire rim tool comprising a central turn-buckle with right and left threads, turn-buckle rods threaded therein and provided with rim engaging extremities, an adjusting nut mounted upon each rod and provided with an annular flange, a wing sleeve fixedly mounted upon each adjusting nut and spaced from the flange on the said nut, a ring loosely mounted upon each nut between the flange thereof and the extremity of the wing sleeve and rim engaging hooks carried by said ring.

2. A tire rim tool comprising a central turn-buckle with right and left threads, turn-buckle rods threaded therein provided with rim engaging extremities, a cylindrical adjusting nut mounted upon each rod and provided with a flattened face, a flange at the outer extremity of each adjusting nut, a wing sleeve provided with a flattened inner face located upon each nut and spaced from the flange thereon, a ring loosely mounted upon each nut between the flange and the extremity of the wing sleeve and rim engaging hooks carried by each ring.

In testimony that we claim the above, we have hereunto subscribed our names.

WILLIAM J. BERG.
ARTHUR B. KIDDER.